United States Patent
LaCous (10) Patent No.: US 7,454,624 B2
(45) Date of Patent: Nov. 18, 2008

(54) MATCH TEMPLATE PROTECTION WITHIN BIOMETRIC SECURITY SYSTEMS

(75) Inventor: Mira Kristina LaCous, Eagan, MN (US)

(73) Assignee: Bio-key International, Inc., Eagan, MN (US)

( * ) Notice: Subject to any disclaimer, the term of this patent is extended or adjusted under 35 U.S.C. 154(b) by 734 days.

(21) Appl. No.: 10/438,161

(22) Filed: May 14, 2003

(65) Prior Publication Data

US 2003/0217276 A1 Nov. 20, 2003

Related U.S. Application Data

(60) Provisional application No. 60/380,805, filed on May 15, 2002.

(51) Int. Cl.
*H04K 1/00* (2006.01)
*H04L 9/00* (2006.01)

(52) U.S. Cl. .................................................... 713/186

(58) Field of Classification Search .................. 713/186
See application file for complete search history.

(56) References Cited

U.S. PATENT DOCUMENTS

| | | | |
|---|---|---|---|
| 4,993,068 A | 2/1991 | Piosenka | 380/23 |
| 5,117,358 A | 5/1992 | Winkler | 708/135 |
| 5,790,668 A * | 8/1998 | Tomko | 713/186 |
| 5,799,086 A | 8/1998 | Sudia | 705/76 |
| 5,815,577 A | 9/1998 | Clark | 380/52 |
| 5,825,880 A | 10/1998 | Sudia et al. | 713/280 |
| 5,841,868 A | 11/1998 | Helbig, Sr. | 235/380 |
| 5,926,550 A | 7/1999 | Davis | 713/176 |
| 6,092,202 A | 7/2000 | Veil et al. | 713/201 |
| 6,202,151 B1 * | 3/2001 | Musgrave et al. | 713/186 |
| 6,246,376 B1 | 6/2001 | Bork et al. | 343/760 |
| 6,317,834 B1 | 11/2001 | Gennaro et al. | 713/186 |
| 6,356,868 B1 | 3/2002 | Yuschik et al. | 704/246 |
| 6,370,648 B1 | 4/2002 | Diep | 713/201 |
| 6,405,922 B1 | 6/2002 | Kroll | 235/379 |
| 6,411,716 B1 | 6/2002 | Brickell | 380/286 |
| 6,418,472 B1 | 7/2002 | Mi et al. | 709/229 |
| 6,507,912 B1 | 1/2003 | Matyas, Jr. et al. | 713/200 |
| 6,546,122 B1 | 4/2003 | Russo | 382/125 |
| 7,194,632 B2 * | 3/2007 | Guerin et al. | 713/186 |

(Continued)

OTHER PUBLICATIONS

Schneier, Bruce. Applied Cryptography. 2nd Edition. pp. 30, 31, 37, and 38. 1997. John Wlley & Sons Inc.*

(Continued)

*Primary Examiner*—Kambiz Zand
*Assistant Examiner*—Jason K Gee
(74) *Attorney, Agent, or Firm*—Westman, Champlin & Kelly, P.A.

(57) ABSTRACT

Biometric security systems are disclosed wherein a match template is unique as compared to a corresponding authentication model generated during enrollment and/or attempts at authentication. In accordance with one embodiment, the uniqueness of the match template as compared to a corresponding biometric authentication model is complete and non-reversible. Accordingly, the data in the match template cannot be directly utilized to produce an authentication model. Accordingly, match templates stored in a database need only be protected to assure that they are not substituted, altered or supplemented. Replication of match template data is not of paramount concern, as it cannot be used for a direct authentication.

17 Claims, 5 Drawing Sheets

U.S. PATENT DOCUMENTS

| | | | |
|---|---|---|---|
| 2001/0050990 A1 | 12/2001 | Sudia | 380/283 |
| 2001/0051924 A1* | 12/2001 | Uberti | 705/44 |
| 2002/0023032 A1 | 2/2002 | Pearson et al. | 713/202 |
| 2002/0023212 A1 | 2/2002 | Proudler | 713/164 |
| 2002/0026584 A1 | 2/2002 | Skubic et al. | 713/180 |
| 2002/0070844 A1* | 6/2002 | Davida et al. | 340/5.53 |
| 2002/0081972 A1 | 6/2002 | Rankin | 455/41.2 |
| 2002/0095587 A1 | 7/2002 | Doyle et al. | 713/186 |
| 2002/0112183 A1 | 8/2002 | Baird et al. | 713/201 |
| 2002/0122055 A1 | 9/2002 | Parupudi et al. | 343/737 |
| 2002/0159596 A1 | 10/2002 | Durand et al. | 380/255 |
| 2002/0166072 A1 | 11/2002 | Cromer et al. | 713/202 |
| 2003/0169640 A1* | 9/2003 | Koenig | 367/191 |
| 2004/0193893 A1* | 9/2004 | Braithwaite et al. | 713/186 |

OTHER PUBLICATIONS

PCT International Search Report.
European Supplemental Search Report.

* cited by examiner

MATCH TEMPLATE PROTECTION WITHIN BIOMETRIC SECURITY SYSTEMS

REFERENCE TO RELATED CASE

This application claims priority from U.S. Provisional Application Serial No. 60/380,805 filed on May 15, 2002, and entitled "BIOMETRIC SECURITY SYSTEMS".

BACKGROUND OF THE INVENTION

The present invention generally pertains to biometric security systems. More specifically, the present invention pertains to biometric security systems that provide an enhanced defense against unlawful hackers and system attackers.

Within a typical biometric security system, there are at least two operations, enrollment and authentication. The operation of enrollment encompasses the original sampling of a person's biometric information, and the creation and storage of a match template (a.k.a., an enrollment template) that is a data representation of the original sampling. The operation of authentication includes an invocation of a biometric sample for the identification or verification of a system user through comparison of a data representation of the biometric sample with one or more stored match templates.

Biometric information is, by nature, reasonably public knowledge. A person's biometric data is often casually left behind or is easily seen and captured. This is true for all forms of biometric data including, but not limited to, fingerprints, iris features, facial features, and voice information. As an example, consider two friends meeting. The one friend recognizes the other by their face and other visible key characteristics. That information is public knowledge. However, a photo of that same person 'is' not that person. This issue similarly applies, electronically, to computer-based biometric authentication wherein a copy of authorized biometric information is susceptible to being submitted as a representation of the corresponding original information. In the context of biometric security applications, what is important, what enables a secure authentication, is a unique and trusted invocation of an authorized biometric.

Numerous known biometric security systems are susceptible to being duped because the data representation of the biometric samples received from the system operator during enrollment and the operation of authentication are in substantially the same format as stored match templates. Accordingly, an individual in possession of a copy of an authorized match template (i.e., obtained through unauthorized database penetration) can substitute the copy for authorized biometric information during the operation of authentication to gain unauthorized access. This is possible because the stolen match template is directly associated with an authorized match template in the database.

For the described typical system, it becomes essential to prevent an authorized match template from being replicated and replayed. Electronic replay has proven to be a key area of concern.

SUMMARY OF THE INVENTION

Embodiments of the present invention pertain to biometric security systems wherein a match template is unique as compared to a corresponding authentication model generated during enrollment and/or attempts at authentication. In accordance with one embodiment, the uniqueness of the match template as compared to a corresponding biometric authentication model is complete and non-reversible. Accordingly, the data in the match template cannot be directly utilized to produce an authentication model. Accordingly, match templates stored in a database for comparison need only be protected to assure that they are not substituted, altered or supplemented. Replication of match template data is not of paramount concern, as it cannot be used for a direct authentication.

DETAILED DESCRIPTION OF THE PREFERRED EMBODIMENTS

The present invention is useful with various types of biometric technology. Specific technologies include iris or retina eye-scan technology, voice technology, face technology, hand geometry technology, DNA technology, spectral biometric technology and fingerprint technology, for example. To the extent that the present description describes a fingerprint-based system, such description is intended to be but one example of a suitable system. The scope of the present invention is not so limited.

Embodiments of the present invention can be configured to facilitate several different types of general security system functions including but not limited to user authentication, access control, or a combination of user authentication and access control. It is to be understood that the concepts of the present invention could just as easily be applied to facilitate other general security system functions.

Embodiments of the present invention can be specifically configured to provide security in association with a variety of access points. Some of these access points are associated with a physical space, such as a building, a room, a particular airport terminal, an airplane, etc. In accordance with one specific embodiment, a biometric scanner is physically positioned within an unsecured area, while access to a separated secured area is denied to anyone who is unable to present authorized biometric information to the biometric scanner for processing by an associated access control program. In accordance with another embodiment, a biometric scanner is physically positioned on an unsecured side of a locked door that remains locked until authorized biometric information is received by the biometric scanner and adequately processed by an associated access control program.

Embodiments of the present invention can also be configured to provide security in association with electronic access points. Through interaction with a computing device, a system operator is able to encounter a wide variety of functional and informational access points or transaction access points, most all of which can potentially be secured utilizing the biometric security systems of the present invention.

A potentially securable electronic access point is encountered when a system operator is presented with an ability to gain general access to a particular computer network (e.g., a particular LAN, the Internet, etc.). Another potentially securable electronic access point is encountered when a system operator is presented with an ability to access a particular collection of information (e.g., medical records, account information, personnel information, protected data files, etc.) that is stored on the computing device with which the system operator is interacting, or is stored on a remote computing device. Another potentially securable electronic access point is encountered when a system operator is presented with an ability to access and operate a particular program that is stored on the computing device with which the system operator is interacting, or is accessibly stored on a remote computing device. Still other potentially securable electronic access points are encountered when a system operator is presented with an ability to access information stored within a particular file or directory, or an ability to access a class of information that is identified in a particular manner (e.g., confidential), or an ability to utilize functions associated with another independent device (e.g., a particular printer). These are only a few of many electronic access points that could be secured utilizing the biometric security systems of the present invention.

Figure 1:
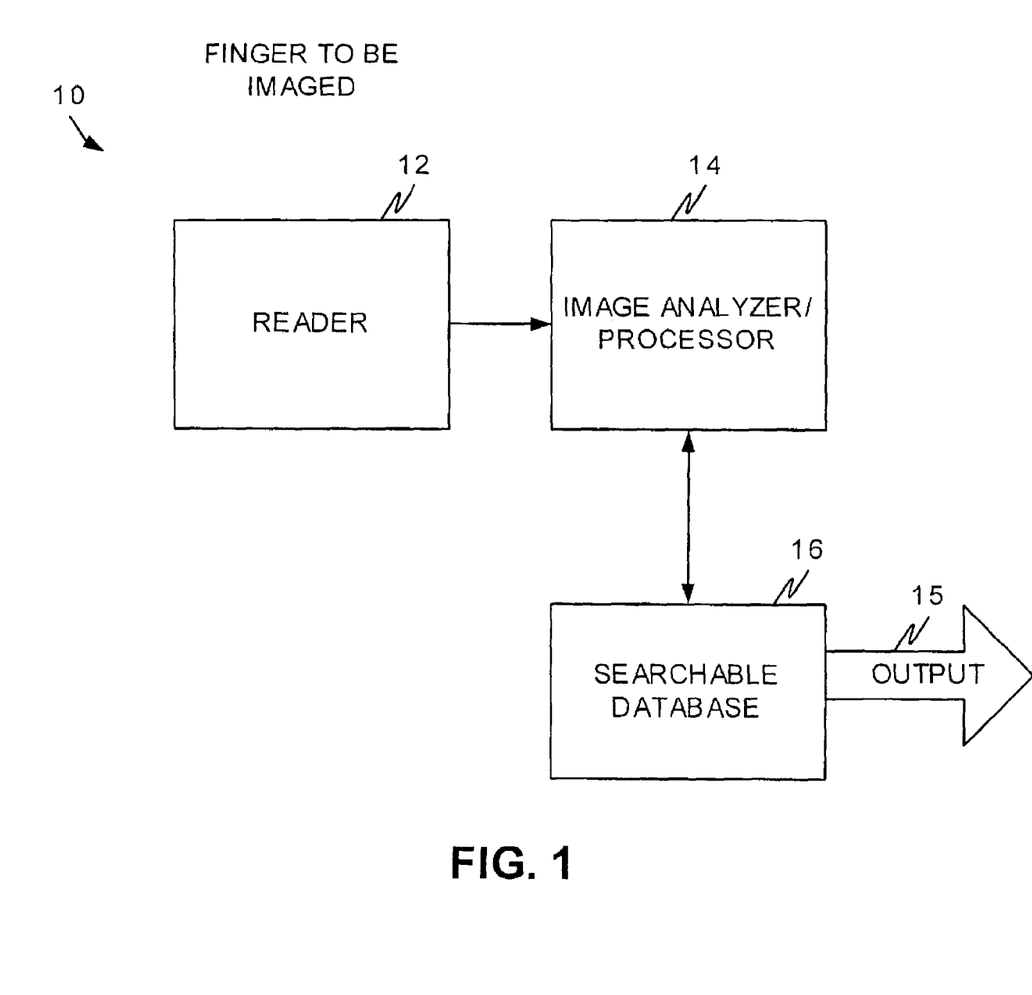
FIG. 1 is a block diagram of a biometric security system.

FIG. 1 is a block diagram of a biometric security system 10 in accordance with illustrative environment within which embodiments of the present invention can be employed. User authentication system 10 includes a reader portion 12, image analyzer/processor 14 and searchable database 16, which further includes an output 15. Reader portion 12 could be any of a number of known devices capable of scanning an image of a fingerprint and transferring data pertaining to the image to an image analyzer, such as image analyzer/processor 14.

In many cases, reader portion 12 will include an optical or electronic device that includes a platen designed to receive the finger to be imaged, and a digitized image is produced. The reader commonly uses light or electricity to image the finger's pattern. Finally, the digitized image is transferred out of the reader portion to an image analyzer/processor 14. Image analyzer/processor 14 varies with application, but generally analyzes the image data received for a wide variety of purposes and applications.

In accordance with one embodiment of the present invention, image analyzer/processor 14 is configured to create an image model based on the particular features and characteristics of images received from reader portion 12. These image models are more than facsimiles of their associated fingerprint images and include a range of data elements that provide analytical opportunities.

In accordance with one embodiment, the model generated based on a contemporaneously received image is compared to at least one match template stored within searchable database 16. The match templates contained in database 16 were each illustratively generated based on previously obtained scanned images during an enrollment process. The match templates are not illustratively configured in the same format as a generated model. In this way, instead of directly comparing a contemporaneously generated model with previously generated models, an indirect comparison (i.e., model v. match template) is made in order to determine whether an image model corresponding to a contemporaneously scanned fingerprint is substantially similar to an image model upon which the match templates included within searchable database 16 were based. More details pertaining to the nature and advantage of this indirect comparison method, which is one aspect of the present invention, will be discussed below in relation to FIG. 3.

Output 15 illustratively represents the comparison result as to whether or not the model based on the contemporaneously scanned fingerprint was a "match" as compared to any of the stored match templates. Output 15 can be used, for instance, to determine whether the person who places a finger on the reader portion 12 should be authorized to enter a room, to access a bank account or to take any other variety of actions. The precise nature of output 15 depends at least on the context within which user authentication 10 is to be applied. For instance, output 15 could be an identification indicator of a match template contained in searchable database 16 that substantially corresponds to the model based on the image contemporaneously scanned by reader portion 12. This is but one example of the many potential forms of output 15. In addition, output 15 may include specialized data to be communicated, such as communicated to a particular application.

Figure 2:
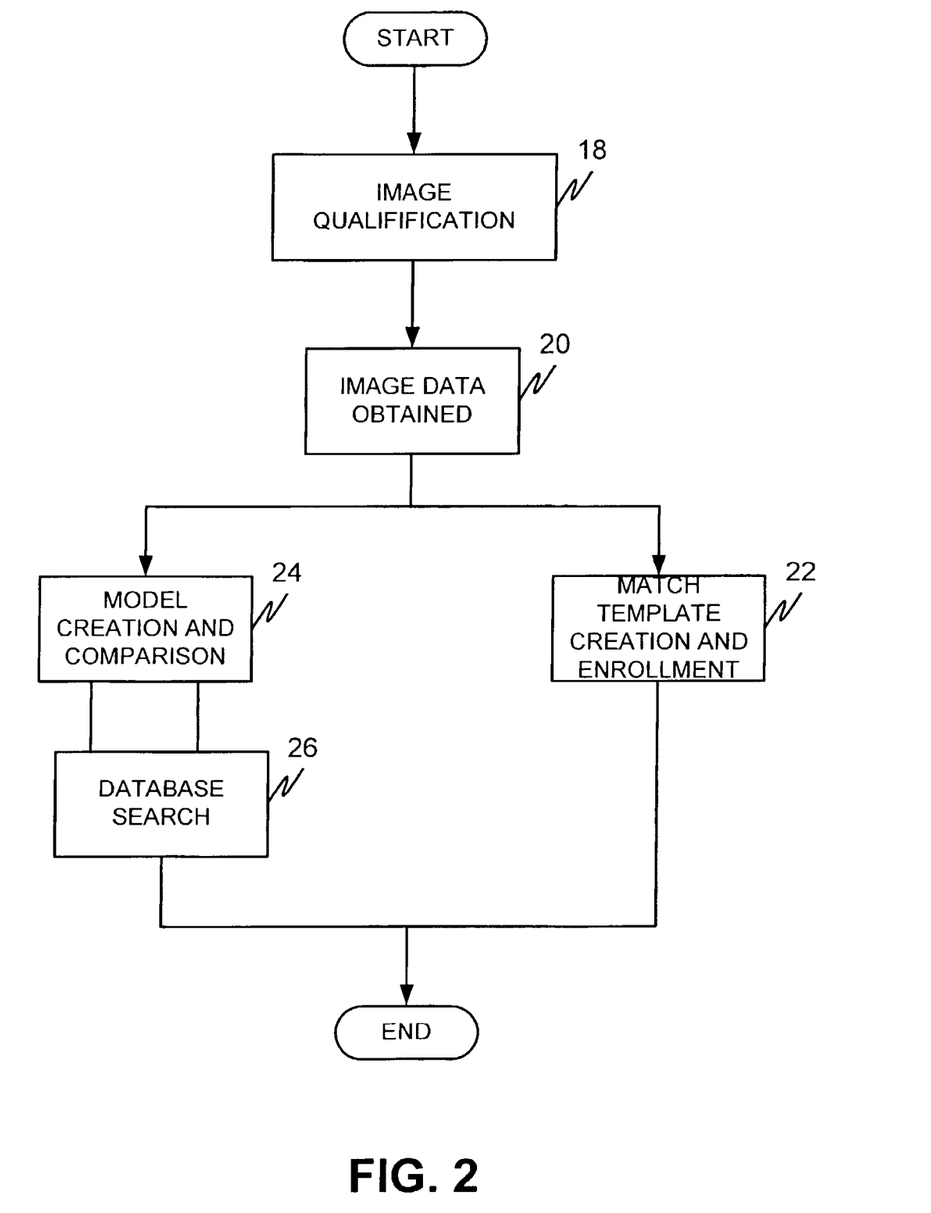
FIG. 2 is a flow diagram illustrating operations to be carried out within the biometric security system.

FIG. 2 is a flow diagram illustrating operations to be carried out within system 10, for example, within analyzer/processor 14, in accordance with an embodiment of the present invention. The process begins when image analyzer/processor 14 receives image data from reader portion 12. After receiving image data, image analyzer/processor 14 illustratively first performs, as is indicated by block 18 in FIG. 2, a series of image qualification functions.

Briefly, image qualification 18 involves quickly processing all or part of the available image data to ensure that the received image is a scan of a real fingerprint (as opposed to a fraudulent fingerprint) and of sufficient quality to proceed with processing. In one embodiment, if the image qualification process leads to the conclusion that the scanned image is fraudulent or of insufficient quality, then processing of the image is interrupted. In such a case, the system user is provided with feedback pertaining to identified inadequacies and is allowed to continue processing only when the inadequacies have been corrected.

Block 20 in FIG. 2 represents the point at which qualified image data has been obtained. After qualified image data has been obtained, in accordance with one embodiment of the present invention, the image data is utilized for one of at least two purposes. First, as is indicated by block 22, is match template creation and enrollment 22. Block 22 represents a process in which match templates are generated (i.e., based on corresponding digitized images) and entered into and catalogued within searchable database 16. Match templates enrolled within database 16, in accordance with one embodiment of the present invention, are not identical to any associated authentication models, but do have characteristics that correspond thereto. This is true at least because they are generated based on the same or substantially similar image data.

As is indicated by block 24 in FIG. 2, and in accordance with another embodiment of the present invention, another purpose for which qualified image data can be utilized is model creation and comparison 24.

Model creation involves analyzing and manipulating the image data, and new data sets originating therefrom, until an authentication model is produced. An authentication model is illustratively a collection of data based on the original print image data and is generally not a facsimile of the original print image. Production of authentication models (also known as image models) is described in U.S. patent application Ser. No. 09/991,589, filed on Nov. 16, 2001, and entitled IMAGE IDENTIFICATION SYSTEM, which is assigned to the same entity as the present case, and which is hereby incorporated by reference in its entirety. Model comparison is a process utilized to compare a generated authentication model to a specific match template stored within the searchable database.

As is indicated by block 26 in FIG. 2, a database search 26 could be performed in association with model comparison 24 to determine which, if any of multiple match templates stored in the searchable database adequately match a generated authentication model. Illustratively, database search 26 is a quick and efficient determination as to which, if any, of potential thousands, or even millions, of match templates within database 16 exhibit a desired level of similarity, as compared to a target authentication model. The target authentication model is illustratively an authentication model associated with a contemporaneously scanned image.

In accordance with one embodiment, rather than comparing authentication models directly to match templates, a set of database keys that describe different match template characteristics are defined to facilitate general rather than specific comparisons to be made during the database search 26 process. The desired level of similarity is illustratively adjustable and can be selected based on a desired level of security (i.e., adjustment to risk tolerance for a biometric false accept) and other characteristics designed to accommodate the environment for which system 10 is to provide security.

In accordance with another embodiment of the present invention, match templates created in association with block 22 are created based on a generated authentication model rather than based on image data directly. In other words, during match template enrollment, qualified image data is received, a corresponding authentication model is generated, and then match template creation and enrollment are carried out based on the generated authentication model.

It should be pointed out that the match templates stored in the searchable database are simply data representations of the 'publicly' known data for various individuals. Since this is the case, the data in a match template is not particularly worthy of being kept secret, only protected to know that the data has not been replaced or supplemented with alternate data that might enable unauthorized access. The foundation of the security provided lies in the ability to obtain a unique and trusted invocation of the person's biometric data. This is the basis for the described system of authentication.

Accordingly, it is the biometric authentication model data that must be protected, trusted and secured. In accordance with one aspect of the present invention, there are at least a few important considerations. First, the match template must be uniquely encoded as compared to the biometric authentication model data. Second, the authentication model data must be trusted as a true representation of the person's biometric information. Finally, the preventing the authentication model data from being replayed (i.e., electronic replay) is paramount.

In accordance with one embodiment of the present invention, the uniqueness of the match template and a corresponding biometric authentication model are complete and non-reversible. Accordingly, the data in the match template cannot be utilized to directly produce an authentication model. The stored match templates need only be protected to assure that they are not substituted, altered or supplemented. For this, they can be effectively managed on a server or some central system to assure that the system can be monitored, validated and maintained for accuracy. Method employed to store match templates on smart cards or other remote systems should ensure that an unauthorized individual can not easily replace, alter or supplement the match template data. Replication of the data is not of paramount concern, as it can not be used for a direct authentication. However, if the match template is compromised, it could be used to 'test' a false entry technique, such as a rubber finger that may pass liveness detection. This is not a key concern, as any sample can be used to test this form of attack, and this needs to be protected with liveness detection of the biometric sample.

It becomes particularly important that the integrity of the authentication models be maintained. There are various known ways to maintain such data integrity. Suffice it to say that the authentication engine or system must be able to 'trust' the biometric data it receives. In accordance with one embodiment, to encourage a trusted relationship, the authentication system starts the transaction and provides a mechanism, such as PKI (Public/Private Key Infrastructure) to assure that the response it is seeing is precisely the one it requested. The integrity of the software or biometric acquisition system from which biometric data is being requested should also be maintained. Data integrity should be maintained at each stage or level of processing of the biometric data during the authentication process. This includes from the capture device to the biometric algorithm, and from the algorithm to subsequent applications.

FIGS. 1-2 present biometric security systems of the present invention in the context of fingerprint-oriented biometric technology. In order to demonstrate the overall breadth of the present invention, biometric security systems of the present invention will now be described in an alternate context/environment.

Figure 3:
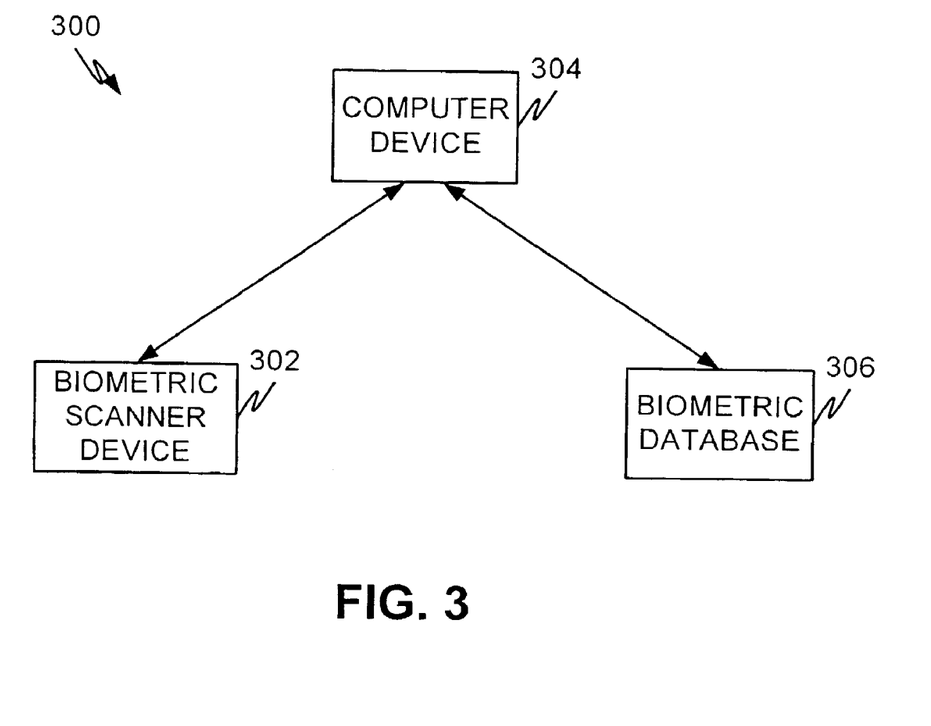
FIG. 3 is a block diagram of another biometric security system.

FIG. 3 is a block diagram of a biometric security system 300. In accordance with one embodiment, system 300 is configured to selectively grant and deny access in association with at least one secured access point. Alternatively, system 300 can be configured to perform a user authentication function or some other function. The specific overall function that is performed by system 300 is illustratively adaptable and is not critical to the present invention.

Illustratively, biometric database 306 is accessibly stored on a computing device that is remotely and communicatively connected to computing device 304. For example, biometric database 306 is illustratively stored on a server database, on a smart card, on a memory card, or on any other known storage medium or device. Alternatively, biometric database 306 is accessibly stored in an internal location within computing device 304. Therefore, within FIG. 3, for the purpose of illustration, database 306 is not directly associated with any particular computing device.

Computing device 304 is illustratively a personal computer, such as a personal desktop computer or a personal laptop computer. However, computing device 304 can alternatively be, without departing from the scope of the present invention, a handheld computing device, a multi-processor computing device, a microprocessor-based or programmable consumer electronic computer device, a mini-computer device, a mainframe computer device or any of a wide range of other known computing devices. Those skilled in the art will also appreciate that embodiments of the present invention can also be applied within computer systems wherein tasks are performed by remote processing devices that are linked through a communications network (e.g., communication utilizing localized, LAN, network, Internet or web-based software systems). In accordance with an embodiment of the present invention, computing device 304 is actually a computing device that is indirectly utilized through communicative connections with at least one other computing device. It should also be pointed out that not all functions need be performed by the same computing device (e.g., model formation and match template generation could occur in association with separate and independent computing devices or processors).

Scanner device 302 is communicatively connected to computing device 304 (e.g., indirectly connected through network communication or directly connected through a connection between corresponding USB port, PCMCIA, PCI, or serial/parallel port interfaces, etc.). Scanner device 302 is configured to collect some sort of biometric information (e.g., fingerprint scan, eye scan, etc.) from a system operator. Scanner device 302 is further configured to transfer the received biometric information to computing device 304 for processing. For facilitating such processing, computing device 304 illustratively operates in association with specialized software components.

In accordance with one aspect of the present invention, system 300 is utilized to enroll at least one authorized system user (e.g., one who is authorized to receive access in association with at least one secured access point). During the enrollment process, scanner device 302 receives biometric information from the authorized system user and transfers an image (e.g., a WSQ, TIFF or bitmap image) of the biometric information to computing device 304. Computing device 304 utilizes a software processing component to generate a match template based on the image data received from scanner device 302. In accordance with one embodiment, after the model has been generated based on the received image, then the image itself is optionally deleted (e.g., erased/cleared from all memory storage locations). The match template is stored within biometric database 306.

During an authentication process, system 300 is utilized to authenticate at least one user. During the authentication process, scanner device 302 receives biometric information from the user and transfers image data (i.e., a WSQ, TIFF or bitmap image) corresponding to the biometric information to computing device 304. Computing device 304 utilizes a software processing component to generate an authentication model based on the image data received from scanner device 302. A relevant reference that describes generation of a model based on image data was discussed previously in the present description and was incorporated by reference. In accordance with one embodiment, after the model has been generated based on the received image data, then the image data itself is optionally deleted (e.g., erased/cleared from all memory storage locations). To complete the authentication process, the generated authentication model is compared to at least one match template stored in database 306 to make a determination as to whether the user is an authorized user.

The data contained within an authorized authentication model is related to, but specifically not identical to, the data contained within a corresponding match template. In accordance with one embodiment, the transformation from image data to match template is carried out utilizing an algorithm scheme that systematically operates (e.g., through performance of a series of organized steps) on various components of received image data to produce a match template that is different than any authentication model generated based on similar or identical image data. Illustratively, depending on the specific nature of the systematic algorithm, and depending on the number of images used to create the match template, the match template may be significantly larger than any corresponding authorized authentication model. For example, an authorized authentication model might contain 2 k of data, while the corresponding match template may include 5 k of data.

In accordance with one embodiment, multiple images of an authorized user's biometric information can be captured by scanner device 302 and processed to produce a single match template for that user. The multiple images can be collected close in time to one another or separated over a period of time.

In accordance with one embodiment, the above-described enrollment process is repeated for multiple authorized system users. Accordingly, biometric database 306 becomes populated with match templates that correspond to (but are not identical to) image data (and authentication models) that are associated with authorized biometric information. The software component that applies a systematic algorithm to generate match templates based on image data is repeatedly applied to enroll multiple authorized users. Similarly, the software component utilized to transform image data into an authorization model is repeatedly applied to generate models for all users who desire access.

In accordance with one embodiment, system 300 can be utilized to simultaneously monitor multiple secured access points. It is conceivable that some system users may be authorized to receive access in association with some but not all of the monitored secured access points. In accordance with one embodiment, an indication of access rights is stored in correspondence to each match template so that computing device 304 (or its associated software) is able to determine which systems users are authorized to receive which access rights. Such an indication could alternatively be catalogued in a secure storage location within computing device 304 itself. Such an indication could be otherwise accessibly stored without departing from the scope of the present invention.

In accordance with one aspect of the present invention, the particular details of the systematic algorithm applied by computing device 304's software component to generate a match template based on image data can be entity-specific. For example, more than one entity (company, government agency, financial institution, etc.) may own and maintain their own version of system 300. One or more entities may desire their own unique algorithm process for generating match templates, such that their particular brand of match templates will all have a general format that is specific to their particular entity. Utilizing different algorithms for different entities provides an added element of security (e.g., knowledge of one entity's algorithm doesn't help a hacker to penetrate another entity's system). In accordance with one embodiment, encryption techniques and/or unique data formats/transformations are utilized to enable unique algorithms for generating different classes of match templates for different entities.

To reiterate in more detail, system 300 is utilized to perform a compare process to determine whether a particular system user is one who is authorized to receive access rights. The compare process illustratively begins when scanner device 302 receives biometric information from a system operator who desires access. An image (e.g., WSQ, TIFF or bitmap) of that biometric information is transferred to computing device 304. Computing device 304 processes the image utilizing a specialized software component to generate an authentication model based on the received image. After the model has been created, the image can be deleted (e.g., erased/cleared from all memory storage locations).

The next step in the compare process is to compare the generated model to the match templates stored in database 306 to determine what, if any, access rights correspond to the model. Because the authentication model is not in the same form as the match templates, the comparison is more of an "apples to oranges" nature than of an "apples to apples" nature. In other words, the matching process is not as simple as finding a match template that is identical to the model. Instead, the authentication model is interpreted in light of the particular algorithm processing utilized to generate the match templates that are stored in database 306. Generally, the issue becomes—would a comparison of authentication model to match template characteristic data yield a positive match? If the answer is yes, then all access rights that correspond to the matching match template are granted. If the answer is no, then all access is denied.

Figure 4:
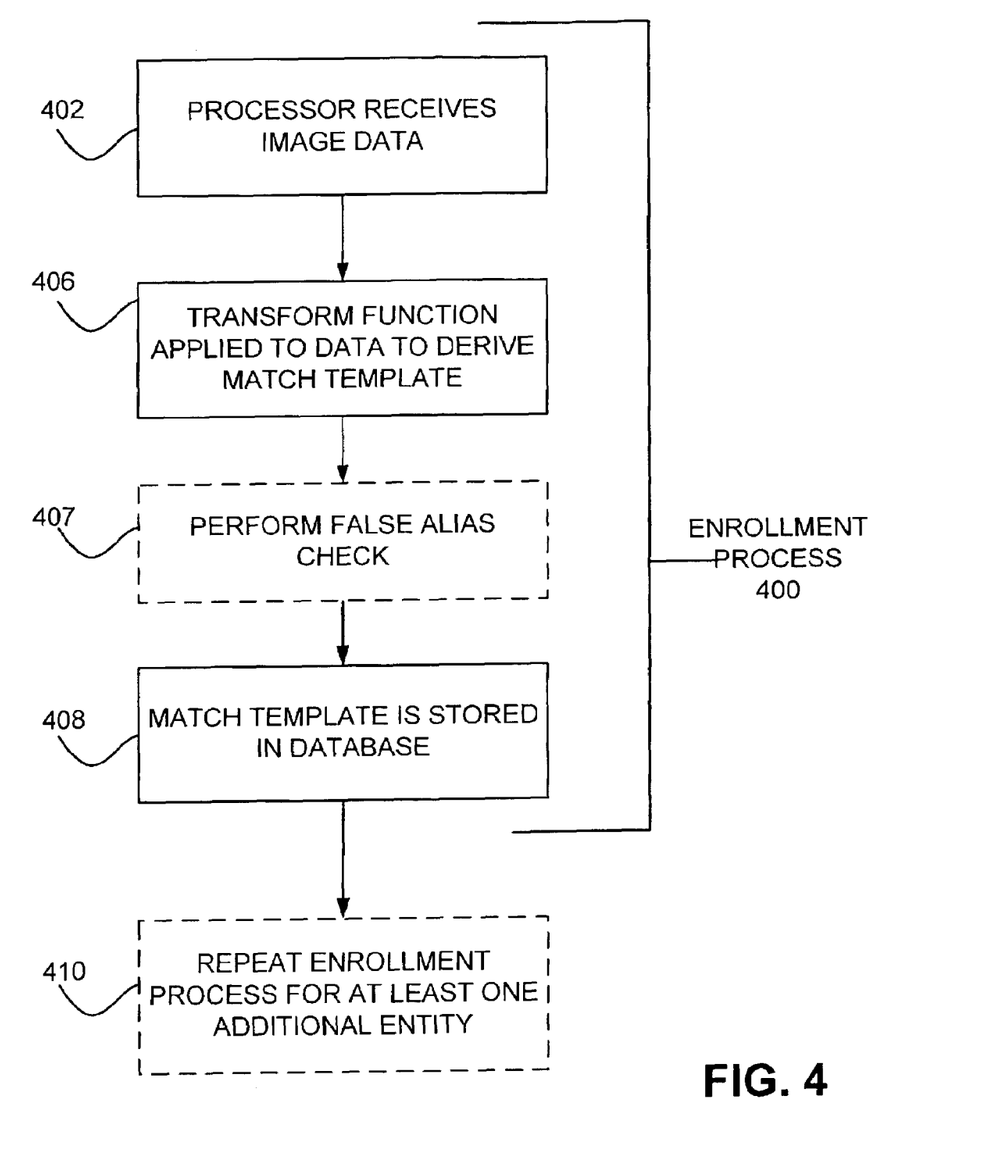
FIG. 4 is a flow chart illustrating general steps associated with enrollment.

FIG. 4 is a flow chart illustrating general steps associated with an enrollment process 400, in accordance with one embodiment of the present invention. In accordance with block 402, a processor receives a collection of image data. In accordance with block 406, a transform function is applied to derive a match template. The match template corresponds to, but not be identical to, the image data.

In some instances, it is important that a given individual be associated with only one match template stored in a searchable database. A company such as Amazon.com may not care whether a single customer has utilized the same biometric information to register ten different aliases. For example, a single customer may desire to generate an authorized match template for the same biometric information in association with themselves, their company, their church, etc. So long as the vendor gets paid for their goods, the issue of multiple aliases is generally unimportant. On the other hand, the Social Security Administration would likely desire to limit each match template to a single user.

With this background in mind, block 407 represents an optional step wherein the derived match template is utilized to perform a false alias check. In accordance with one embodiment, the check is accomplished through a comparison of the derived match template to the match templates stored in the searchable database. The search will reveal false aliases, which the system can be configured to flag, prohibit or eliminate.

Generally speaking, each of an individual's fingerprints includes a different print pattern. Accordingly, in systems where multiple aliases are undesirable, it could problematic for a single individual to enroll (i.e., make a match template) each finger individually with a different alias. In accordance with one embodiment, an individual is required to enroll all possible biometric samples (i.e., all ten fingers, both eyes, etc.) during enrollment process 400 and multiple aliases are prohibited.

In accordance with block 408, the match template is stored in a database (i.e., database 16 in FIG. 1).

The enrollment process 400 includes an optional step 410. In accordance with optional step 410, the enrollment process is repeated for multiple entities. As was mentioned above, more than one entity (company, government agency, financial institution, etc.) may own and maintain their own biometric security system. One or more of these entities may desire their own unique algorithm process for generating match templates, such that their particular match templates will all have a general format that is specific to their particular entity. Utilizing different algorithms for different entities provides an added element of security (e.g., knowledge of one entity's algorithm doesn't help a hacker to penetrate another entity's system).

Figure 5:
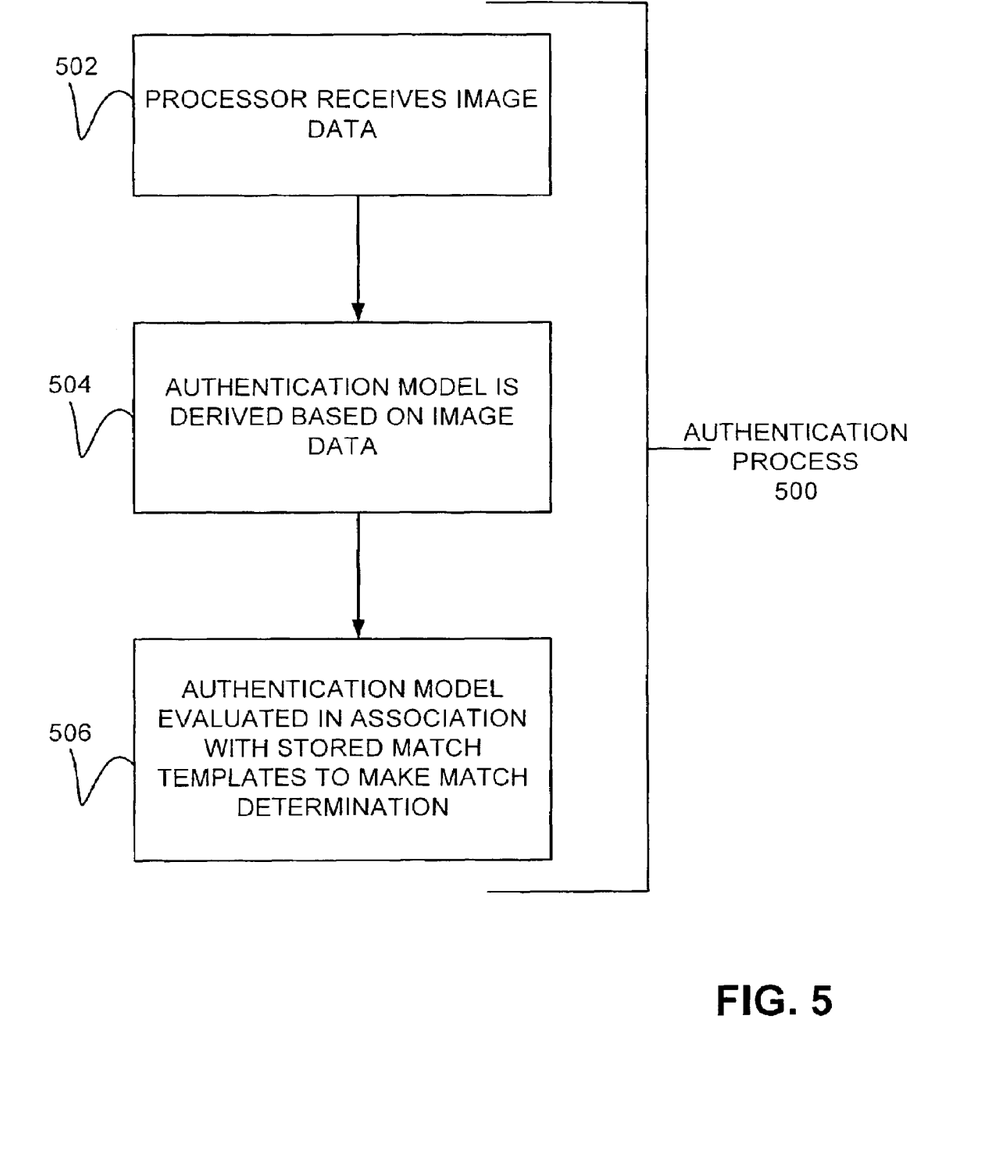
FIG. 5 is a flow chart illustrating general steps associated with authentication.

FIG. 5 is a flow chart illustrating steps associated with an authentication process 500, in accordance with one embodiment of the present invention. In accordance with step 502, a processor receives image data. In accordance with block 504, an authentication model is derived based on the image data. Once an authentication model has been derived, in accordance with step 506, it is evaluated or compared to one or more match templates stored in a searchable database. In this way, instead of directly comparing authentication models with previously generated models, an indirect comparison is made in order to determine whether there is a match worthy of granting access. It should be noted that in instances where multiple entities maintain their own systems with their own algorithm (i.e., in accordance with block 410 in FIG. 4), authentication process 500 is applied for each system independently.

Although the present invention has been described with reference to particular embodiments, workers skilled in the art will recognize that changes may be made in form and detail without departing from the spirit and scope of the invention.

What is claimed is:

1. A method for performing user authentication in the context of a biometric security system, the method comprising:
   obtaining a first collection of biometric data based on a first biometric source;
   applying a transform function to the first collection of biometric data to generate a match template;
   receiving from a biometric data collector a second collection of biometric data based on the first biometric source;
   generating an authentication model based on the second collection of biometric data, the authentication model being different than the match template, wherein the process utilized to generate the authentication model is distinct from the processing associated with applying the transform function such that the representation of biometric data associated with the authentication model will be different than the representation of biometric data associated with the match template even if the first and second collections of biometric data were identical;
   comparing the authentication model to the match template, wherein comparing comprises evaluating the relationship between the authentication model and the match template without directly comparing one to the other, and wherein comparing comprises comparing the authentication model to a set of database keys that describe a plurality of match template characteristics; and
   granting or denying an access right based on the result of the comparison of the authentication model to the match template.

2. The method of claim 1, wherein applying the transform function to generate the match template further comprises applying the transform function to generate the match template as a non-reversible derivation of the first collection of biometric data.

3. The method of claim 1, wherein the transform function is an entity-specific transform function.

4. The method of claim 1, wherein comparing comprises comparing without applying the transform function to the authentication model.

5. The method of claim 1 wherein granting or denying an access right is based upon a similarity of the authentication model to the set of database keys and wherein a level of similarity is adjustable.

6. A method of providing security in the context of a biometric security system, the method comprising:
   obtaining a first data representation of a first collection of biometric information;
   obtaining a second data representation of a second collection of biometric information;
   applying an entity specific transform function to the first and second data representations to produce an entity specific match template, wherein data from both the first and second data representations are used to produce the entity specific match template;
   obtaining a third data representation of a third collection of biometric information;
   generating an authentication model based on the third data representation;
   comparing the authentication model to the entity specific match template to determine whether they are sufficiently related to be deemed matching, wherein comparing comprises comparing without applying the entity specific transform function to the authentication model; and granting at least one access right if they are sufficiently related to be deemed matching.

7. The method of claim 6, wherein granting at least one access right comprises granting access in association with a physical access point.

8. The method of claim 6, wherein granting at least one access right comprises granting access in association with an electronic access point.

9. The method of claim 6, wherein the processing steps utilized to generate the authentication model are different than the processing steps associated with applying the entity specific transform function.

10. The method of claim 6, wherein comparing comprises evaluating the relationship between the authentication model and the entity specific match template without comparing one to the other.

11. The method of claim 6 wherein the size of the entity specific match template is larger than the size of the authentication model.

12. The method of claim 6 wherein the entity specific match template includes more data than the authentication model.

13. The method of claim 6 wherein the first and second collections of biometric information are collected close in time to one another.

14. The method of claim 6 wherein the first and second collections of biometric information are collected over a period of time.

15. The method of claim 6 and further comprising deleting the first and second data representations.

16. The method of claim 15 wherein the first and second data representations are deleted before the third data representation is obtained.

17. A method for performing user authentication in the context of a biometric security system that simultaneously monitors a plurality of access points, the method comprising:

obtaining a first collection of biometric data based on a first biometric source;

applying a transform function to the first collection of biometric data to generate a match template, wherein the match template is a non-reversible derivation of the first collection of biometric data;

deleting the first collection of biometric data;

storing an indication of access rights in correspondence to the match template;

receiving from a biometric data collector a second collection of biometric data based on the first biometric source;

generating an authentication model based on the second collection of biometric data, the authentication model being different than the match template, wherein the process utilized to generate the authentication model is distinct from the processing associated with applying the transform function such that the representation of biometric data associated with the authentication model will be different than the representation of biometric data associated with the match template even if the first and second collections of biometric data were identical;

comparing the authentication model to the match template, wherein comparing comprises evaluating the relationship between the authentication model and the match template;

comparing the indication of access rights to a required access right of at least one of the plurality of access points; and granting or denying an access right based on the result of the comparison of the authentication model to the match template and based on the result of the comparison of the indication of access rights and the required access right.

* * * * *